US010059299B2

(12) United States Patent
Yamada

(10) Patent No.: US 10,059,299 B2
(45) Date of Patent: Aug. 28, 2018

(54) AIRBAG DEVICE

(71) Applicant: Autoliv Development AB, Vårgårda (SE)

(72) Inventor: Akihiro Yamada, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 57 days.

(21) Appl. No.: 15/303,306

(22) PCT Filed: Mar. 16, 2015

(86) PCT No.: PCT/JP2015/057655

§ 371 (c)(1),
(2) Date: Oct. 11, 2016

(87) PCT Pub. No.: WO2015/156088

PCT Pub. Date: Oct. 15, 2015

(65) Prior Publication Data

US 2017/0036639 A1 Feb. 9, 2017

(30) Foreign Application Priority Data

Apr. 11, 2014 (JP) ................................ 2014-082294

(51) Int. Cl.
*B60R 21/233* (2006.01)
*B60R 21/205* (2011.01)
*B60R 21/231* (2011.01)

(52) U.S. Cl.
CPC .......... *B60R 21/233* (2013.01); *B60R 21/205* (2013.01); *B60R 21/231* (2013.01); *B60R 2021/23107* (2013.01)

(58) Field of Classification Search
CPC ............................ B60R 21/205; B60R 21/233
See application file for complete search history.

(56) References Cited

U.S. PATENT DOCUMENTS 3,801,126 A * 4/1974 Knight, IV ........... B60R 21/205 180/90
4,262,931 A 4/1981 Strasser et al.
(Continued)

FOREIGN PATENT DOCUMENTS

CA 1 160 657 1/1984
CA 2 584 099 10/2007
(Continued)

OTHER PUBLICATIONS

Fujiwara et al., Air Bag Device for Passenger Seat, JPO, JP 2012-056371 A, Machine Translation of Description (Year: 2012).*
(Continued)

*Primary Examiner* — James A English
(74) *Attorney, Agent, or Firm* — Brinks Gilson & Lione

(57) ABSTRACT

An airbag device capable of preventing an occupant from contacting a center console and restraining rotation of the occupant head. The airbag includes a first airbag deployed in front of an occupant of a seat to restrain the occupant from moving forward, and a second airbag coupled to a side of the first airbag on a center side of a vehicle interior to restrain the occupant from moving laterally during deployment. The second airbag has a front end portion that reaches a center console during deployment, and a rear end portion positioned further behind a rear end of the first airbag and extending to a center of the head of the occupant during deployment while the occupant is in contact with the first airbag.

19 Claims, 19 Drawing Sheets

18 C E 20 18a A 24 12a 20a 20b 26 D 24a UP FRONT BACK DOWN B 25 12

FIRST EMBODIMENT

(56) References Cited

U.S. PATENT DOCUMENTS 5,609,363 A * 3/1997 Finelli .................. B60R 21/231 280/730.1
7,152,880 B1 12/2006 Pang et al.
8,882,138 B1 11/2014 Hicken et al.
9,272,684 B1 * 3/2016 Keyser .................. B60R 21/237
9,428,140 B2 * 8/2016 Lee ...................... B60R 21/239
9,738,243 B2 * 8/2017 Fukawatase .......... B60R 21/233
9,796,354 B1 * 10/2017 Hayashi ................ B60R 21/239
2002/0135164 A1 9/2002 Thomas
2003/0115945 A1 6/2003 Tsujita
2003/0218325 A1 11/2003 Hasebe et al.
2004/0051285 A1 3/2004 Fischer
2005/0029779 A1 2/2005 Bito et al.
2005/0230945 A1 10/2005 Watanabe
2006/0186656 A1 8/2006 Kumagai
2010/0090445 A1 4/2010 Williams et al.
2013/0001934 A1 1/2013 Nagasawa et al.
2014/0361521 A1 12/2014 Fukawatase
2015/0166002 A1 * 6/2015 Fukawatase .......... B60R 21/233 280/730.1
2015/0258958 A1 * 9/2015 Belwafa ................ B60R 21/233 280/729
2015/0258959 A1 * 9/2015 Belwafa ................ B60R 21/233 280/729
2015/0343986 A1 * 12/2015 Schneider ............. B60R 21/205 280/729
2016/0039385 A1 * 2/2016 Watamori ......... B60R 21/23138 280/730.1
2016/0046257 A1 * 2/2016 Yamada .............. B60R 21/2338 280/729
2016/0059817 A1 * 3/2016 Umehara .............. B60R 21/233 280/729
2016/0144820 A1 * 5/2016 Shin ...................... B60R 21/239 280/735
2017/0129444 A1 * 5/2017 Fukawatase .......... B60R 21/233

FOREIGN PATENT DOCUMENTS

CN 1459394 A 12/2003
CN 1824548 A 8/2006
CN 1951732 A 4/2007
CN 200985009 Y 12/2007
CN 200985010 Y 12/2007
CN 102849017 A 6/2011
CN 102186702 A1 9/2011
DE 602 04 277 T2 11/2005
DE 10 2007 032 763 A1 1/2008
DE 10 2012 018 450 A1 3/2014
EP 1 364 838 A2 5/2003
EP 1 398 228 A2 3/2004
EP 1 498 320 A2 1/2005
EP 1 775 176 A1 4/2007
EP 1 775 177 A1 4/2007
EP 1 842 742 A2 10/2007
EP 1 693 256 B1 8/2008
EP 2 799 292 A1 11/2014
JP 56-67649 6/1981
JP 3-32956 2/1991
JP 4-55141 2/1992
JP 5-65706 8/1993
JP 6-72276 3/1994
JP 8-72661 3/1996
JP 10-71920 3/1998
JP 2000-280845 10/2000
JP 2003-182500 7/2003
JP 2003-335203 11/2003
JP 2004-262432 9/2004
JP 2005-88681 4/2005
JP 2005-247118 9/2005
JP 2006-88856 4/2006
JP 2006-256508 9/2006
JP 2006-327505 12/2006
JP 2007-112427 5/2007
JP 2007-112430 5/2007
JP 2007-216733 8/2007
JP 2007-276771 10/2007
JP 2008-44594 2/2008
JP 2008-114615 5/2008
JP 2008-179173 8/2008
JP 2009-227180 3/2009
JP 2009-120114 6/2009
JP 2010-201980 9/2010
JP 2012-56371 3/2012
JP 2012-505783 3/2012
JP 2013-14176 1/2013
JP 2013-35473 2/2013
JP 2013-112276 6/2013
JP 2014-121965 7/2014
KR 2007-0042093 4/2007
KR 2007-0052192 5/2007
KR 2011-0071076 6/2011
MX 2007003946 A 11/2008
WO WO 2010/045040 A1 4/2010
WO WO 2013/099036 A1 7/2013

OTHER PUBLICATIONS

Iwamoto et al., Airbag and Airbag Device, JPO, JP 2010-201980 A, Machine Translation of Description (Year: 2010).*
PCT International Search Report—dated Oct. 6, 2015.
PCT International Search Report—dated Jun. 9, 2015.
PCT International Search Report—dated Apr. 7, 2015.
PCT International Search Report—dated Apr. 21, 2015.

* cited by examiner

PRIOR ART

PRIOR ART

FIG. 3
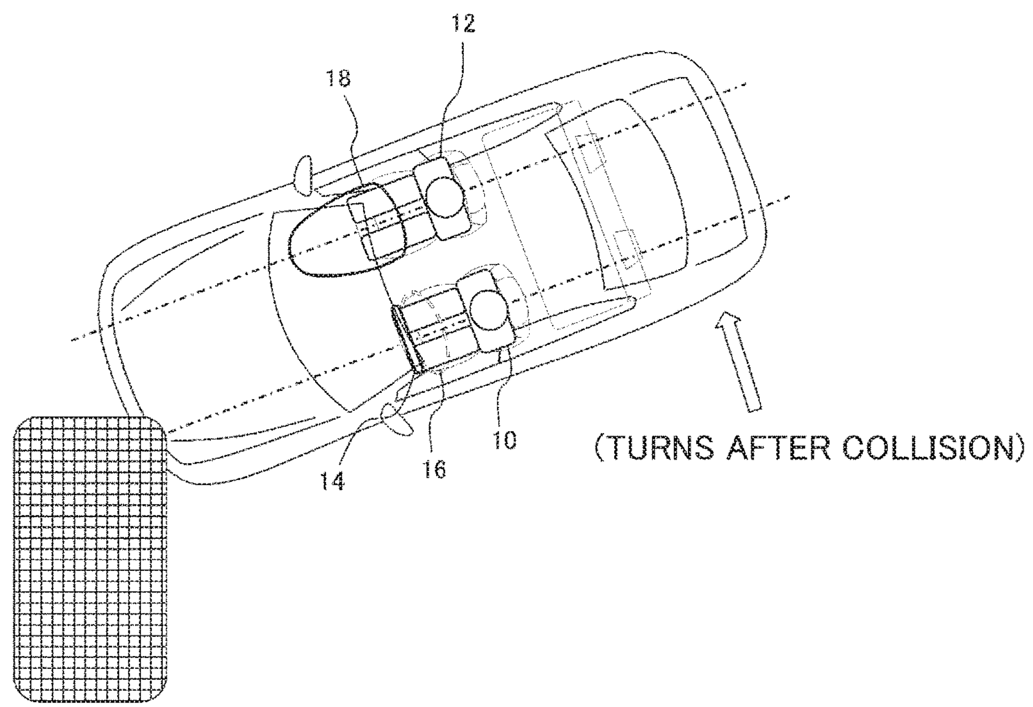
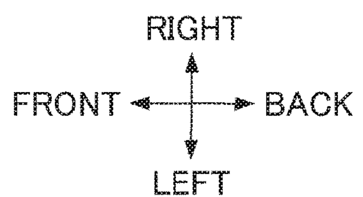
PRIOR ART

FIG. 4
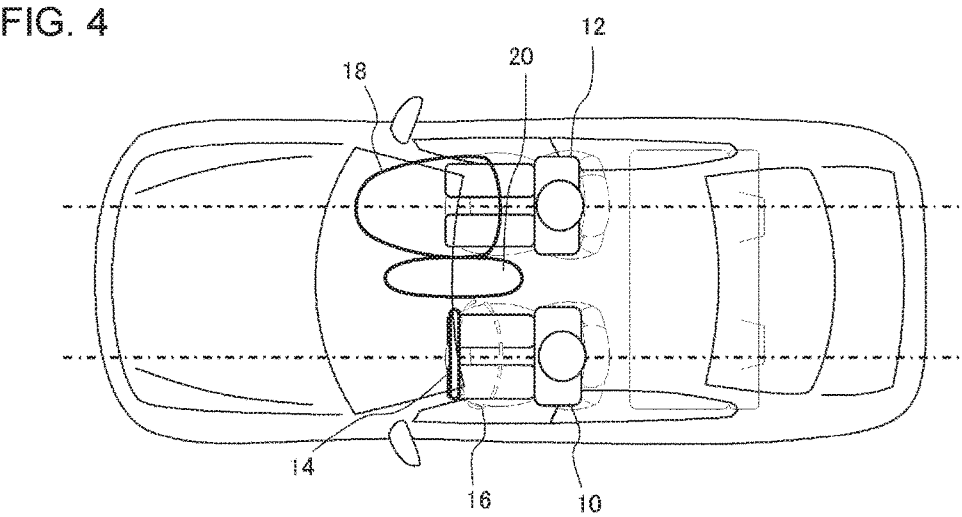
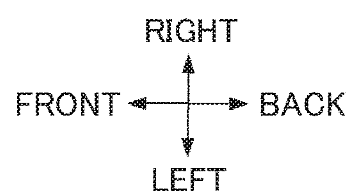

FIRST EMBODIMENT 18
23A
20
23B
18a
20a
24
12a
20b
24a
23C
25
23D
26
23
UP
FRONT
BACK
DOWN 20a
23C
18
23B
23A
FRONT
LEFT
RIGHT
BACK
20b
20

20b
23A
18
UP
LEFT
RIGHT
20
DOWN

FIRST EMBODIMENT

FIRST EMBODIMENT

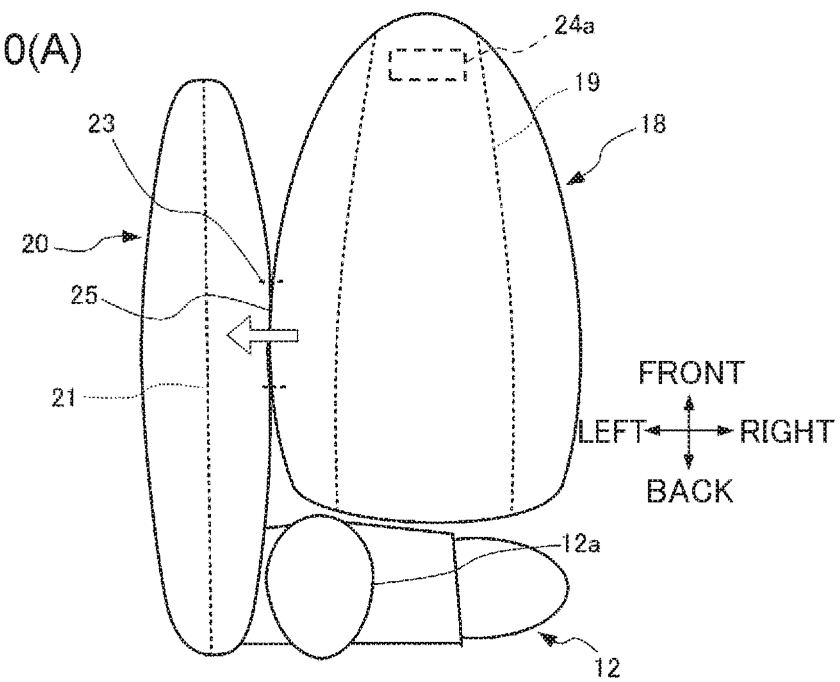
FIRST EMBODIMENT
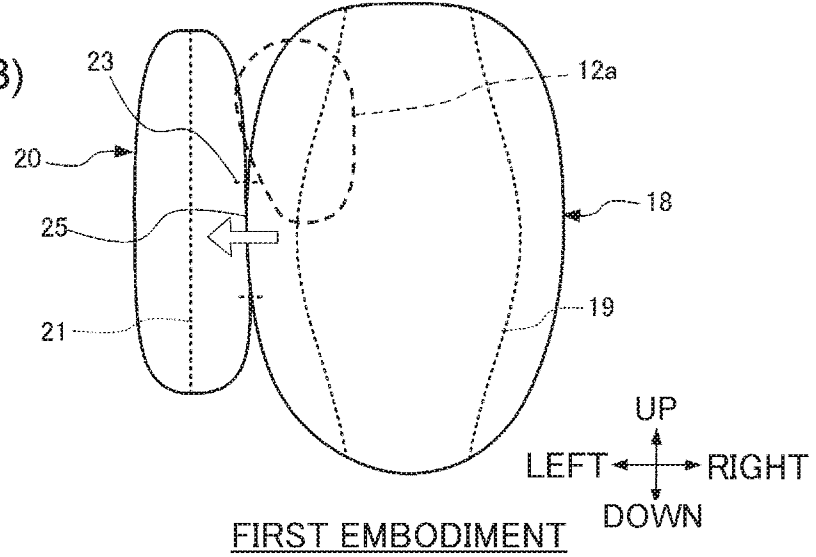
FIRST EMBODIMENT 18
20
23B
18a
20a
24
12a
20b
23A
24a
25
23C
23D
26
23
UP
FRONT
BACK
DOWN 20a
23C
18
23B
23A
FRONT
LEFT
RIGHT
BACK
20
20b 20b
23A
18
UP
LEFT
RIGHT
20
DOWN 18
25a
20
23B
18a
20a
24
12a
20b
23A
25
24a
23C
23D
25
26
23
UP
FRONT
BACK
DOWN 20a
23C
18
23B
23A
20b
20
FRONT
LEFT
RIGHT
BACK 20b
18
23A
20
UP
LEFT
RIGHT
DOWN

SECOND EMBODIMENT

SECOND EMBODIMENT

SECOND EMBODIMENT

SECOND EMBODIMENT 18
20
100a
20b
25
L1
26
20a
24
24a
L2
100e
L3
UP
FRONT
BACK
DOWN
100b
THIRD EMBODIMENT 18
100a
20
25
20b
L1
20a
26
24
24a
L2
100e
L3
UP
FRONT
BACK
DOWN
20c
FOURTH EMBODIMENT 18
100a
20
20b
20a
L1
25
24
26
24a
L2
100e
20d
L3
UP
FRONT
BACK
DOWN
FIFTH EMBODIMENT 20
100a
L1
18
20b
100c
25
L2
20e
L3
100b
100e
UP
FRONT
BACK
DOWN
SIXTH EMBODIMENT

AIRBAG DEVICE

CROSS REFERENCE TO RELATED APPLICATIONS

This application claims priority to Japanese Patent Application No. 2014-082294, filed on Apr. 11, 2014, and PCT/JP2015/057655, filed on Mar. 16, 2015.

FIELD OF THE INVENTION

The present invention relates to an airbag device that protects an occupant in a vehicle by deploy an airbag. More particularly, the invention relates to an airbag device provided inside an instrument panel in a vehicle to protect mainly an occupant of a front passenger seat.

BACKGROUND

In general, an airbag device for a front passenger seat is configured such that an inflator generates inflation gas and an airbag is inflated and deployed by the gas are stored inside an instrument panel. The inflator is activated in response to a vehicle collision to cause the airbag to be inflated and deployed toward the inside of the vehicle, so that the occupant is restrained.

In recent years, there has been a demand for safety features to cope with various states of collisions including a collision of an obstacle with a part of a vehicle and an oblique collision of a part of a vehicle with an obstacle as well as a frontal collision in which the front end of a vehicle collides with an obstacle (such as an oncoming car) in a directly opposite direction.

Referring to the appended drawings, FIG. 1 is a plan view of a structure of a conventional vehicle (left-hand drive) provided with an airbag device for a driver seat and a front passenger seat, showing that the vehicle advances at an angle of 0° with respect to an object (obstacle) shown as a generally rectangular crosshatched object which is offset from the directly opposite position to the front of the vehicle. A driver seat airbag 16 is stored inside a steering wheel 14 in front of a driver 10 and adapted to be deployed toward the occupant in a vehicle collision. An airbag 18 for the front passenger seat is stored inside an instrument panel 24 (not shown in FIG. 1) in front of an occupant 12 of the front passenger seat and configured to be deployed toward the occupant in a vehicle collision. The airbags 16 and 18 are configured to be inflated by inflation gas supplied from an inflator (not shown) activated in response to a signal from a crash sensor.

FIG. 2 is a plan view of a structure of a conventional vehicle provided with an airbag device for a driver seat and a front passenger seat, showing that the vehicle advances at a prescribed angle θ with respect to an object (obstacle) which is offset from the directly opposite position to the front of the vehicle. FIG. 3 shows how the vehicle body is turned after a collision with the object (obstacle) from its state in FIG. 2. In the situation as shown in FIG. 3, the occupant 12 of the front passenger seat could slide beside the front passenger seat airbag 18 and contact the center console between the driver seat and the front passenger seat. If this happens, the occupant 12 could be exposed to head rotation and possible injury caused by contacting the center console. An index of such brain injuries is called BRIC (Brain Rotational Injury Criteria).

SUMMARY

The present invention is in view of the above-described situations and it is an object of the present invention to provide an airbag device capable of preventing an occupant from contacting a center console and restraining rotation of the cervical region (head) of the occupant well.

In order to solve the above-described problem, an airbag device according to the present invention includes a first airbag deployed in front of an occupant of a seat to restrain the occupant from moving forward, and a second airbag coupled to a side of the first airbag on a center side of a vehicle interior to restrain the occupant from moving laterally during deployment. The second airbag has a front end portion that reaches a center console during deployment, and a rear end portion positioned further behind a rear end of the first airbag and extending to a center of the head of the occupant during deployment while the occupant is in contact with at least the first airbag.

According to the present invention as described above, the occupant can be prevented from contacting the center console, and rotation of the cervical region (head) of the occupant can also be restrained.

The rear end portion of the second airbag can be configured to extend to an occipital region of the occupant during deployment. The structure ensures that the head of the occupant can be more surely protected.

The device may include an inflator that supplies inflation gas to the first airbag, an opening communicating with both the first airbag and the second airbag may be formed at a coupling part between the airbags, and gas may be made to flow from the first airbag to the second airbag. In this arrangement, a device with a simple structure using a single inflator can be provided.

The rear end portion of the second airbag may have an upper end reaching the head region of the occupant and a lower end reaching a shoulder of the occupant in a height direction. In this way, the occupant can be restrained.

The first airbag and the second airbag may be coupled by sewing, and a rear end surface of the first airbag and a rear end surface of the second airbag may be coupled by a flexible panel, so that the head of the occupant is prevented from coming into a boundary between the airbags. In this way, the cervical region of the occupant can be restrained from rotating, and contact with the center console can be more effectively avoided.

When the first and second airbags are projected and observed from a side of the vehicle on the second airbag side, points may be positioned in descending order of height: E, C, D, A, and B, where the point A is a highest point of the second airbag in contact with the center console, the point B is a lowest point thereof, the point C is a highest point in an overlapping area between the rear end surface of the first airbag and the second airbag, the point D is a lowest point thereof, and the point E is a top of the second airbag. The points may be positioned from the front to the back: A, B, C, D, and E, where the point A is a highest point of the second airbag in contact with the center console, the point B is a lowest point thereof, the point C is a highest point in an overlapping area between the rear end surface of the first airbag and the second airbag, the point D is a lowest point thereof, and the point E is a top of the second airbag. In this way, the capacity of the second airbag can be reduced to the minimum necessary level, so that the airbag device as a whole can be reduced in size and produced less costly.

BRIEF DESCRIPTION OF THE DRAWINGS

FIG. 3 is a plan view of a structure of a conventional (prior art) vehicle provided with an airbag device for a driver seat and a front passenger seat, showing that the vehicle advances at a prescribed angle θ with respect to an object (obstacle) which is offset from the directly opposite position to the front of the vehicle and then the vehicle body turns.

FIG. 4 is a plan view of a general structure of a vehicle provided with an airbag device according to the present invention.

FIG. 6(A) shows the head as observed from the front, the top, and the side.

FIG. 8(A) is a side view.

FIG. 9(A) is a top view.

FIGS. 10(A) and (B) show the airbag device according to the first embodiment of the present invention during deployment in an oblique collision situation, FIG. 10(A) is a top view, and FIG. 10(B) is a front view.

FIG. 12(A) is a side view.

FIG. 13(A) is a side view.

FIG. 14(A) is a top view.

FIG. 15(A) is a top view.

DETAILED DESCRIPTION

Now, the present invention will be described in detail with reference to an airbag device for a front passenger seat by way of illustration. FIG. 4 is a plan view of a general structure of a vehicle provided with the airbag device according to the present invention. According to the present invention, an auxiliary airbag 20 is coupled to a side of a front passenger seat airbag 18.

Figure 5:
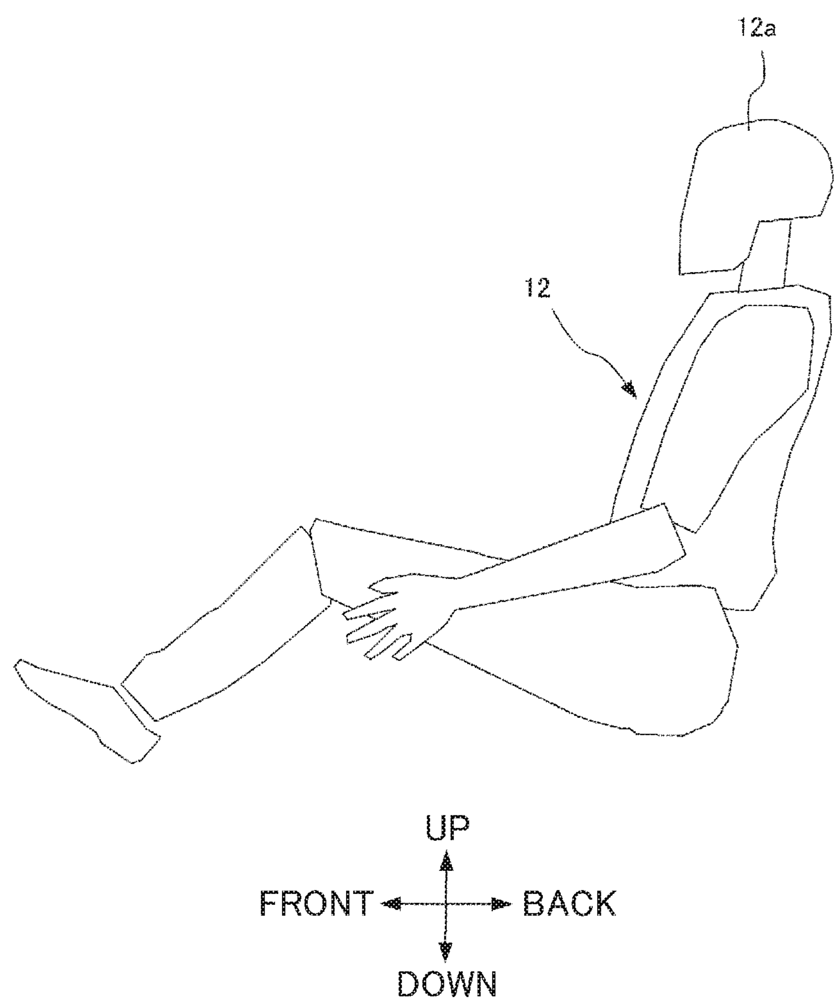
FIG. 5 is a side view of an occupant dummy for use in a vehicle collision test.
Figure 6A:
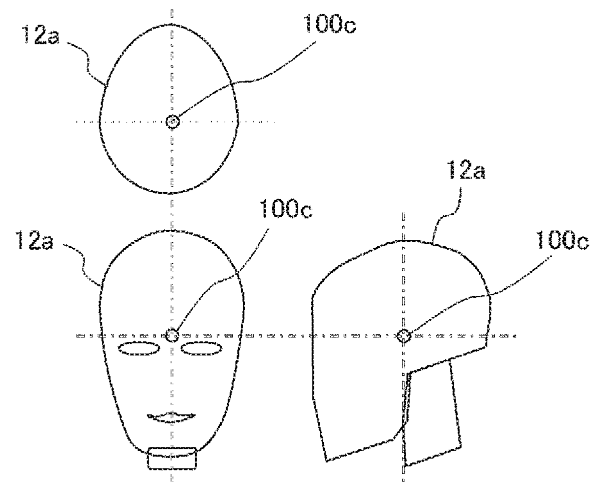
FIGS. 6(A)and (B) show a dummy for use in a vehicle collision test.
Figure 6B:
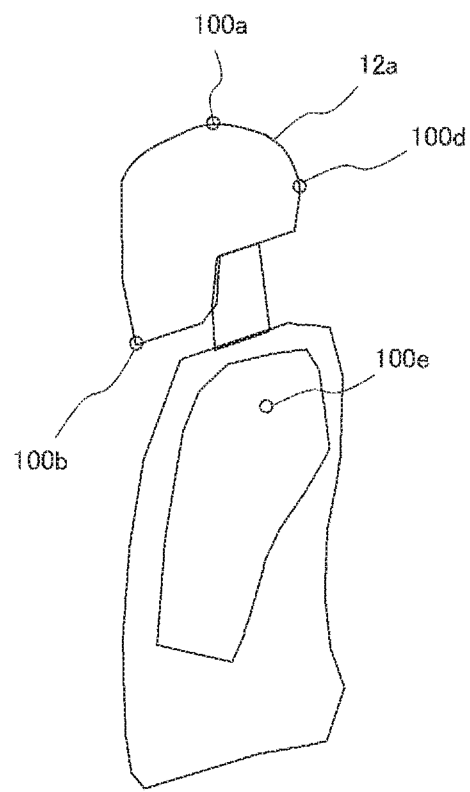
FIG. 6(B) shows the upper half of the body as observed from the side.

FIG. 5 is a side view of an occupant dummy 12 for use in a vehicle collision test. FIGS. 6(A) and (B) show the dummy 12 for use in a vehicle collision test, FIG. 6(A) shows the head 12*a* as observed from the front, top, and side, and FIG. 6(B) shows the upper half of the body as observed from the side. In FIG. 6(A), 100*c* denotes the center of the head 12*a*. In FIG. 6(B), 100*a* denotes a measurement location of the parietal region, 100*d* denotes a measurement location of the occipital region, 100*b* denotes a measurement location of the jaw top part, and 100*e* denotes a measurement location of the center of the shoulder joint. In the following description, the dummy 12 will be assumed as the occupant 12 for the ease of description.

Figure 7:
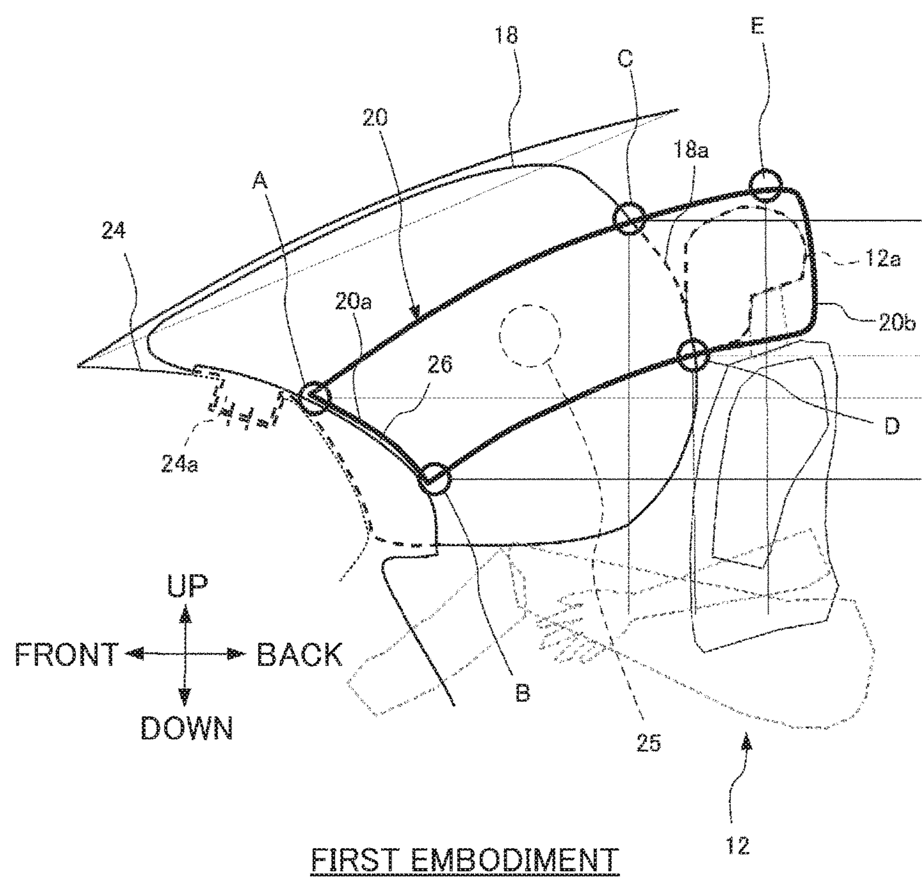
FIG. 7 is a side view of a structure of an airbag device according to a first embodiment of the present invention during deployment.

FIG. 7 is a side view of a structure of an airbag device according to a first embodiment of the present invention during deployment. The airbag device according to the present invention includes a front passenger seat (or first) airbag 18 deployed in front of the occupant 12 of a seat and adapted to restrain the occupant 12 from moving forward and an auxiliary (or second) airbag 20 coupled to the side of the front passenger seat airbag 18 on the center side of the interior of the vehicle and adapted to restrain the occupant 12 from moving laterally during deployment.

The front passenger seat airbag 18 and the auxiliary airbag 20 are stored inside an instrument panel 24 and configured to be inflated and deployed by inflation gas supplied from an inflator 24*a* activated in response to a signal from a crash sensor in a vehicle collision.

The auxiliary airbag 20 has a front end portion 20*a* that reaches the center console 26 during deployment, and a rear end portion 20*b* positioned further behind a rear end surface 18*a* of the front passenger seat airbag 18 and extending to the occipital region 100*d* of the occupant 12 during deployment while the occupant 12 is in contact with at least the front passenger seat airbag 18. An opening 25 communicating with both the front passenger seat airbag 18 and the auxiliary airbag 20 is formed at a coupling part between the airbags, so that inflation gas is made to flow into the auxiliary airbag 20 from the front passenger seat airbag 18. Center console 26 may be a separate component from instrument panel 24 or may be considered as the central portion of the instrument panel located between front seat occupants 12. In many cases, center console 26 may protrude rearwardly with respect to the vehicle from other surfaces of the instrument panel and particularly from the passenger side front seat area of the instrument panel.

The front passenger seat airbag 18 and the auxiliary airbag 20 are stored in a housing (not shown) provided inside the instrument panel 24 and inflated by the single inflator 24*a*. In a deployed form, the auxiliary airbag 20 is curved to be raised slightly above the center console 26 and elongated in the front-back direction toward the head 12*a* of the occupant 12. The curved structure can minimize the capacity of the auxiliary airbag 20. As a result, the airbag can be deployed swiftly and can start restraining the occupant more quickly. In addition, the inflator capacity can be reduced, which increases the degree of freedom in terms of packaging and designing of the vehicle.

FIG. 7 is a view of the front passenger seat airbag 18 and the auxiliary airbag 20 as projected and observed from the side of the vehicle on the side of the auxiliary airbag 20. In the view, the highest point of the auxiliary airbag 20 in contact with the center console 26 is A, the lowest point thereof is B, the highest point in the overlapping area between the rear end surface 18*a* of the front passenger seat airbag 18 and the auxiliary airbag 20 is C, the lowest point thereof is D, and the top of the auxiliary airbag 20 is E. In this case, the order of the points in descending order of height is preferably E, C, D, A, and B. Further, the points are preferably positioned in the order of A, B, C, D, and E from the front to the back.

In this arrangement, the head 12*a* of the occupant 12 can be protected while the auxiliary airbag 20 may have the minimum necessary size. In view of the positional relation between the points C and D in particular, the head 12*a* of the occupant can be kept in a stooping (forward bending) position from initial contact of the head 12*a* with the airbag 20 to a later stage of restraint, so that a cervical injury by backward bending toward the occipital region can be reduced. The auxiliary airbag 20 may be formed to have its upper and lower sides both raised, in other words, its middle part may be raised both upward and downward.

Figure 8A:
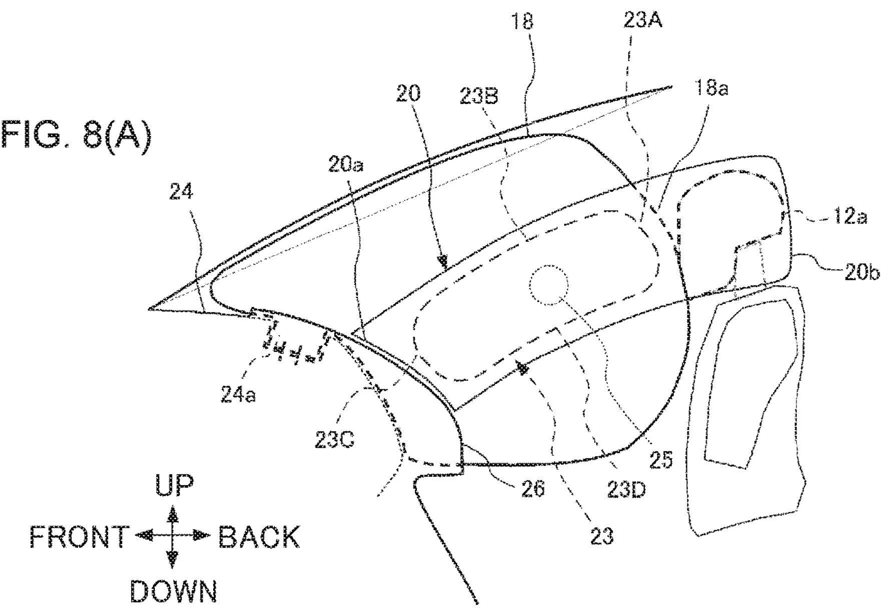
FIGS. 8(A), (B) and (C) show how the airbags in the airbag device according to the first embodiment shown in FIG. 7 are coupled.
Figure 8B:
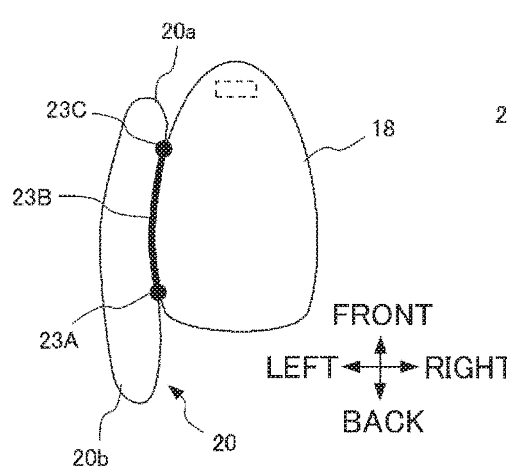
FIG. 8(B) is a top view.
Figure 8C:
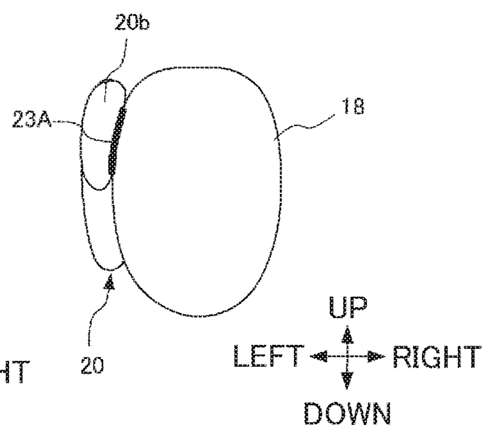
FIG. 8(C) is a front view.

FIGS. 8(A), (B) and (C) show how the airbags 18 and 20 of the airbag device according to the first embodiment shown in FIG. 7 are coupled, FIG. 8(A) is a side view, FIG. 8(B) is a top view, and FIG. 8(C) is a front view. The airbags 18 and 20 are coupled by sewing 23 that surrounds the opening 25. Preferably, the sewing 23 is formed in the largest possible range in the overlapping region between the auxiliary airbag 20 and the front passenger seat airbag 18 and smoothly curved with rounded corners. The sewing 23 includes a rear end portion 23A on the side of the head 12*a* of the occupant, an upper edge portion 23B, a front end portion 23C closer to the center console 26, and a lower edge portion 23D opposed to the upper edge portion 23B.

The sewing 23 for coupling the auxiliary airbag 20 and the front passenger seat airbag 18 is formed along a smooth approximate ellipse as shown in FIG. 8(A), so that stress applied upon the sewing 23 during inflation of the bags can be eased and a tearing-resistant structure results. Increase in the range of the sewing 23 contributes to stable behavior of the airbags during deployment. More specifically, positioning sewing 23A much behind the opening 25 on the rear side in the vehicle can effectively prevent the head 12*a* of the occupant from coming into the boundary part between the front passenger seat airbag 18 and the auxiliary airbag 20. In addition, positioning sewing 23B much ahead of the opening 25 on the front side in the vehicle can prevent the front passenger seat airbag 18 and the auxiliary airbag 20 from moving apart from each other, so that an appropriate reaction force surface can be formed.

Figure 9A:
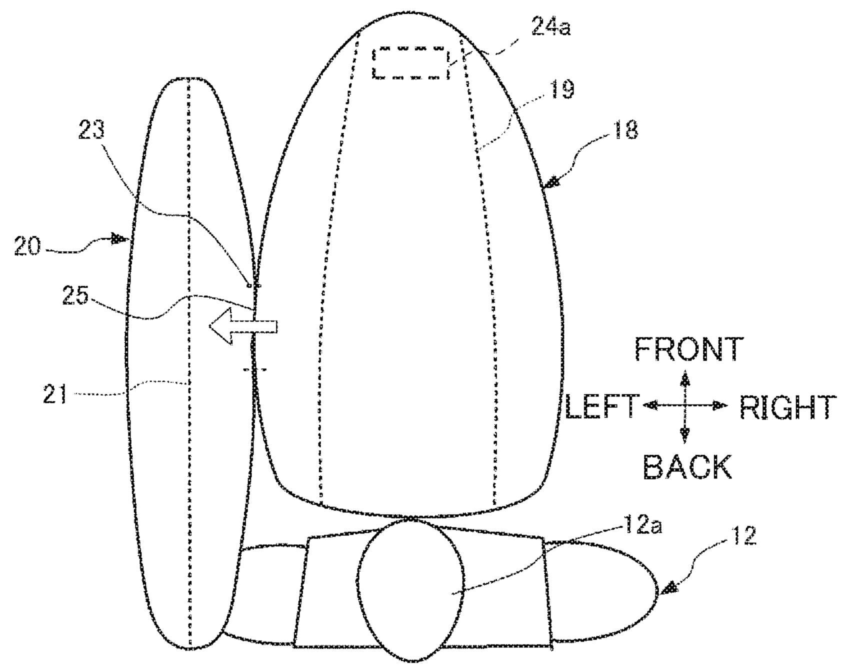
FIGS. 9(A) and (B) show the airbag device according to the first embodiment of the present invention during deployment in a frontal collision situation.
Figure 9B:
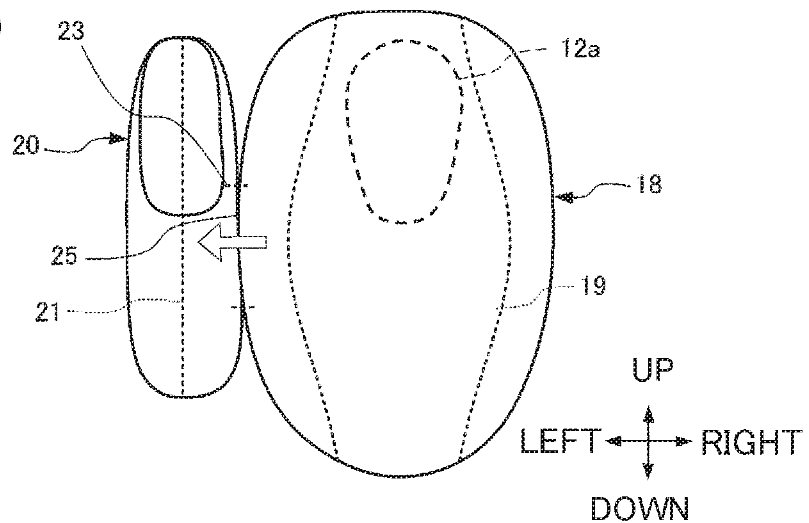
FIG. 9(B) is a front view.

FIGS. 9(A) and (B) show a state of the airbag device according to the first embodiment during deployment in a frontal collision situation, FIG. 9(A) is a top view, and FIG. 9(B) is a front view. FIGS. 10(A) and (B) show a state of the airbag device according to the first embodiment during deployment in an oblique collision situation, FIG. 10(A) is a top view, and FIG. 10(B) is a front view. As described above, the front passenger seat airbag 18 and the auxiliary airbag 20 are coupled by the sewing 23, and the head 12*a* of the occupant 12 is restricted from coming into the boundary between the airbags 18 and 20.

The front passenger seat airbag 18 can be formed into a bag shape for example by coupling three panel sheets by sewing 19. The auxiliary airbag 20 can be formed into a bag shape for example by coupling two panel sheets by sewing 21. The auxiliary airbag 20 is elongated in the front-back direction when viewed from above and adapted to restrain the head 12*a* of the occupant 12 by the side of the part protruding backward beyond the front passenger seat airbag 18 (see FIGS. 9(A) and (B), and 10(A) and (B)).

Figure 1:
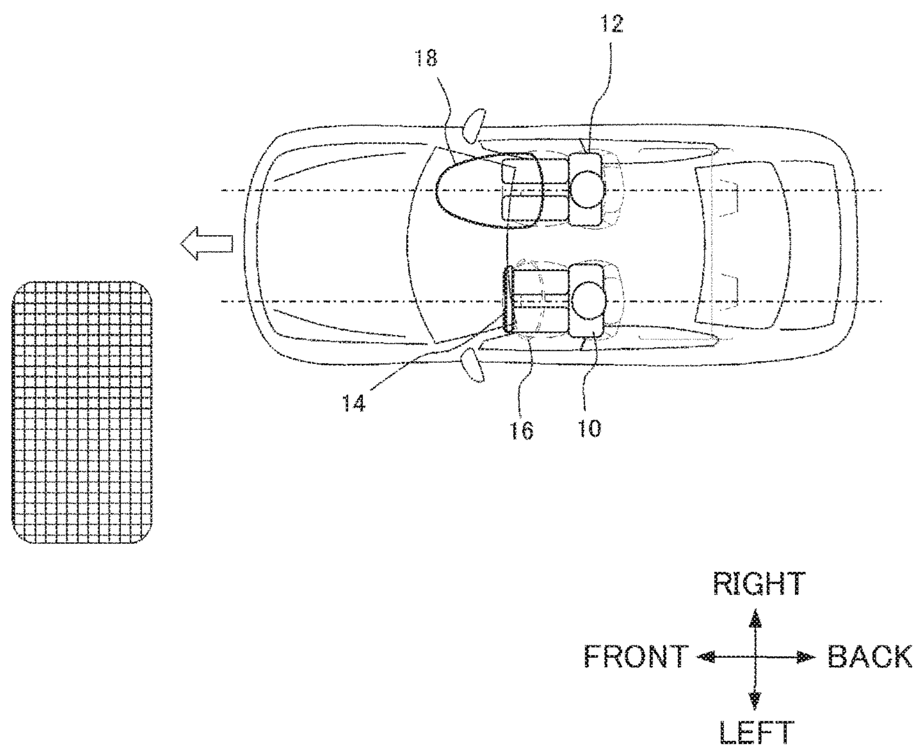
FIG. 1 is a plan view of a structure of a conventional (prior art) vehicle provided with an airbag device for a driver seat and a front passenger seat, showing that the vehicle advances at an angle of 0° with respect to an object (obstacle) which is offset from the directly opposite position to the front of the vehicle.
Figure 2:
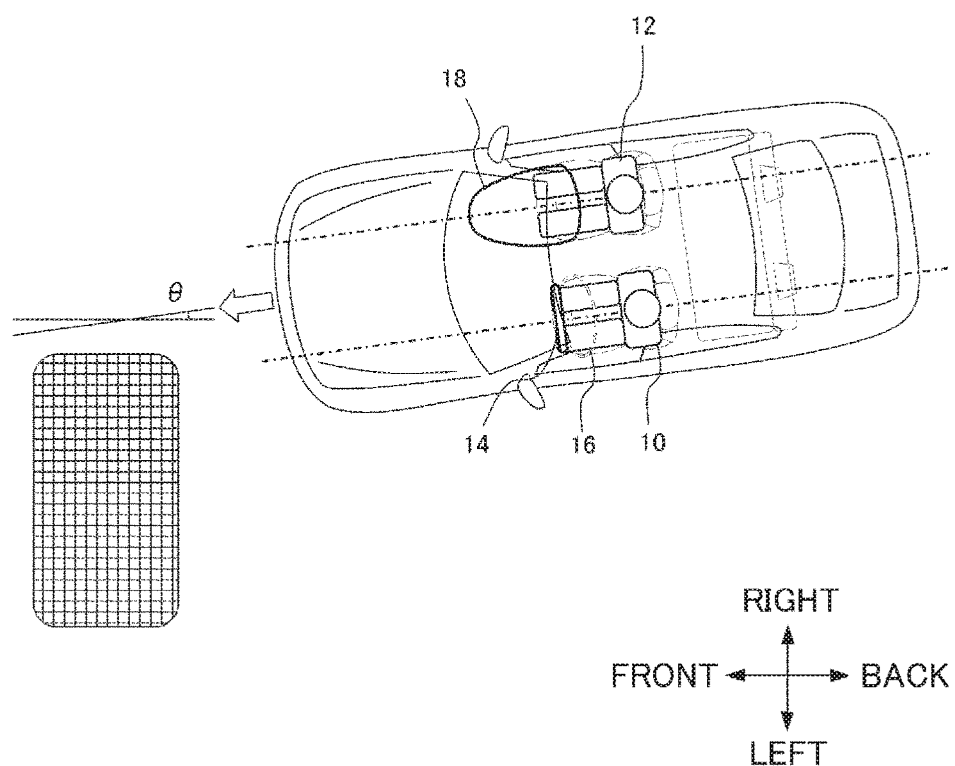
FIG. 2 is a plan view of a structure of a conventional (prior art) vehicle provided with an airbag device for a driver seat and a front passenger seat, showing that the vehicle advances at a prescribed angle θ with respect to an object (obstacle) which is offset from the directly opposite position to the front end of the vehicle.

According to the embodiment, when for example an oblique collision as shown in FIG. 2 and FIG. 3 happens, gas supplied from the inflator 24*a* reaches the front passenger seat airbag 18 and then the auxiliary airbag 20 through the opening 25, and the airbags 18 and 20 are deployed in the states as shown in FIG. 7 and FIG. 8. At the time, the head 12*a* of the occupant 12 may move toward the center console 26 by momentum caused by the collision, but the movement can be restrained by the auxiliary airbag 20 as shown in FIG. 10(B). In addition, the head 12*a* of the occupant 12 may turn leftward by the momentum caused by the collision, but the turning can also be minimized by the auxiliary airbag 20.

Figure 11:
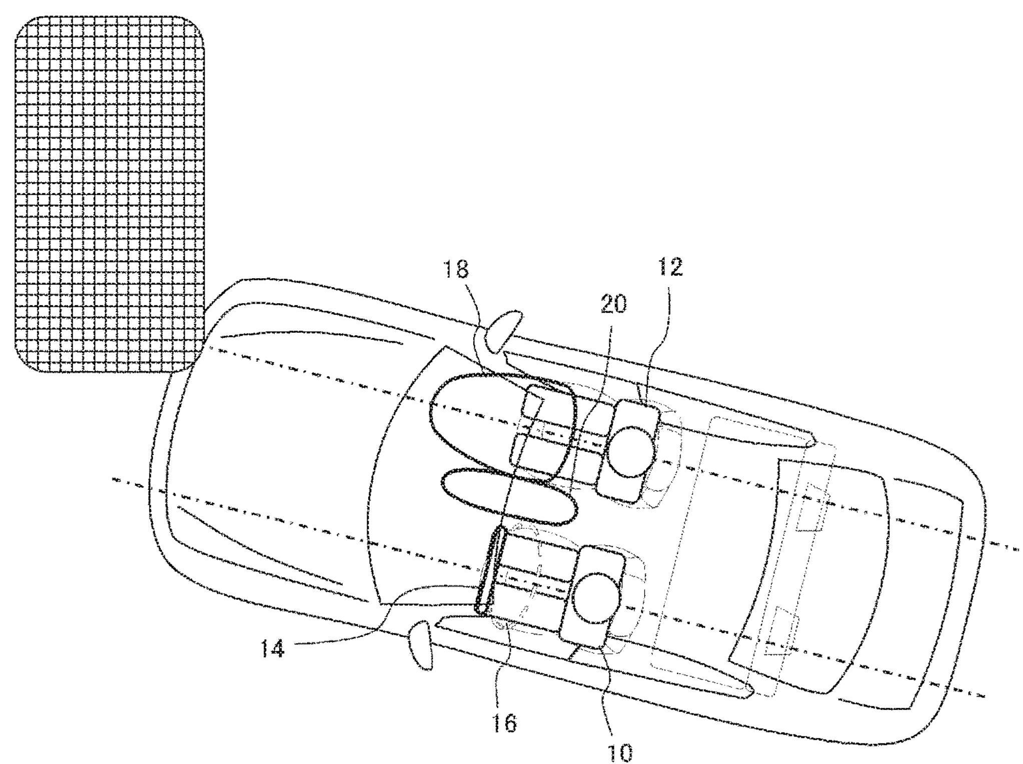
FIG. 11 is a plan view of a structure of a vehicle provided with the airbag device according to the first embodiment of the present invention, showing that the vehicle advances at a prescribed angle θ from the front passenger seat side with respect to an object (obstacle) which is offset from the directly opposite position to the front of the vehicle and then the vehicle body turns.

FIG. 11 is a plan view of a structure of a vehicle provided with the airbag device according to the first embodiment of the invention, showing that the vehicle advances at a prescribed angle from the side of the front passenger seat with respect to an object (obstacle) which is offset from the directly opposite position to the front of the vehicle, and then the vehicle body is turned. In this case, the driver 10 may be thrown toward the center console 26 but the auxiliary airbag 20 can prevent not only the occupant 12 of the front passenger seat but also the driver 10 from moving laterally, and the turning of the heads can be restrained.

Figure 12A:
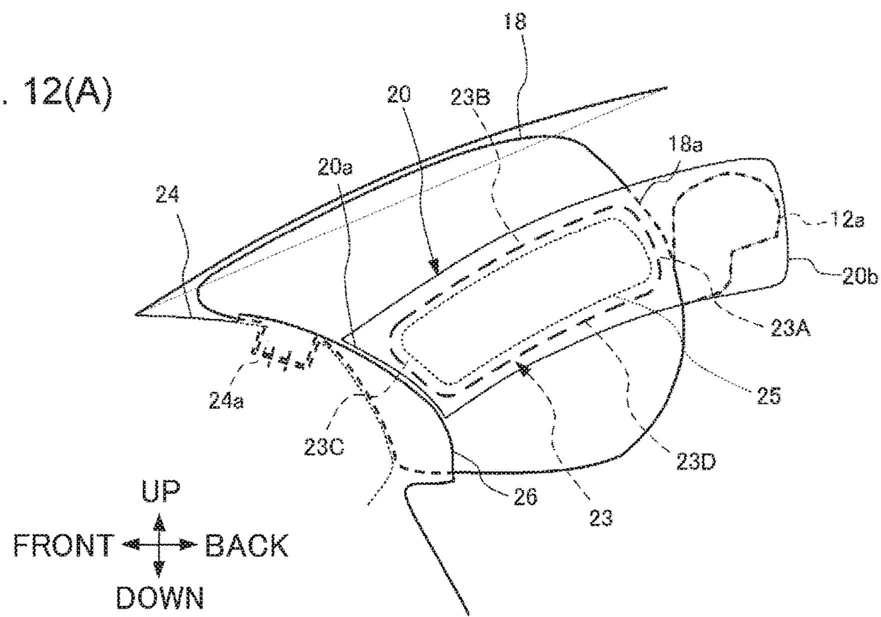
FIGS. 12(A), (B) and (C) show how airbags in an airbag device according to a modification of the first embodiment of the present invention are coupled.
Figure 12B:
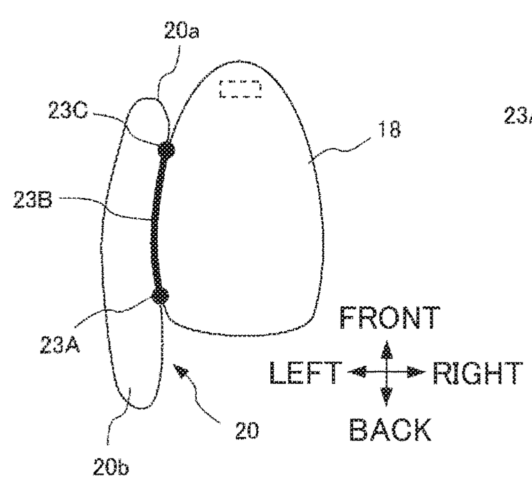
FIG. 12(B) is a top view.
Figure 12C:
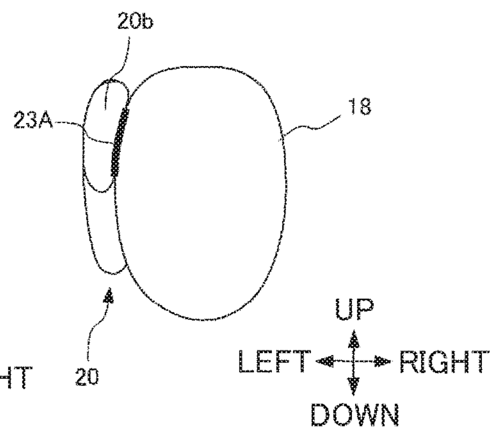
FIG. 12(C) is a front view.

FIGS. 12(A-C) show a modification of the first embodiment of the present invention, FIG. 12(A) is a side view, FIG. 12(B) is a top view, and FIG. 12(C) is a front view. According to the modification, the opening 25 that brings the front passenger seat airbag 18 and the auxiliary airbag 20 into fluid-communication has a greater area, and the other structure is the same as that in FIG. 11. According to the modification, inflation gas is made to flow more quickly from the front passenger seat airbag 18 to the auxiliary airbag 20 through the larger opening 25, so that the auxiliary airbag 20 can be deployed at increased speed.

Figure 13A:
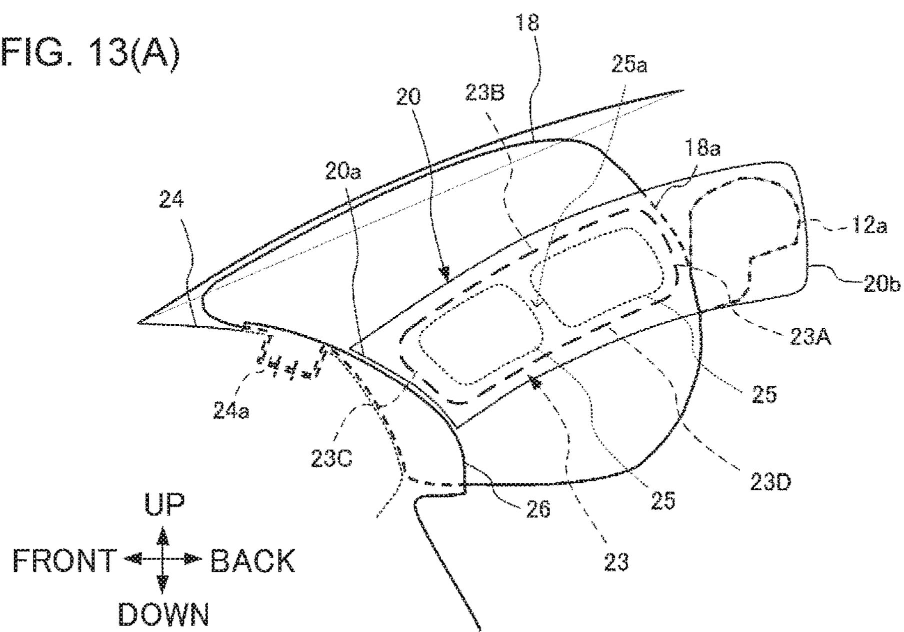
FIGS. 13(A), (B) and (C) show how airbags in an airbag device according to another modification of the first embodiment of the present invention are coupled.
Figure 13B:
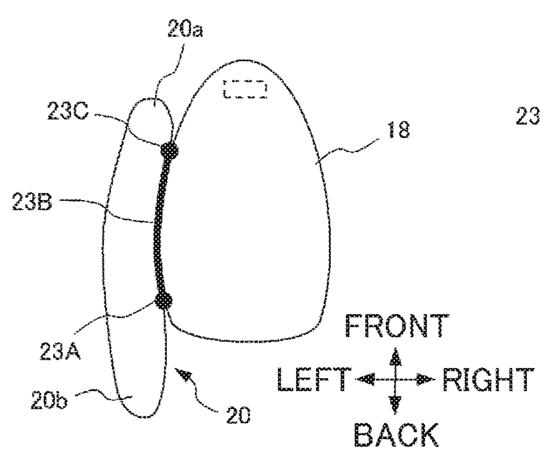
FIG. 13(B) is a top view.
Figure 13C:
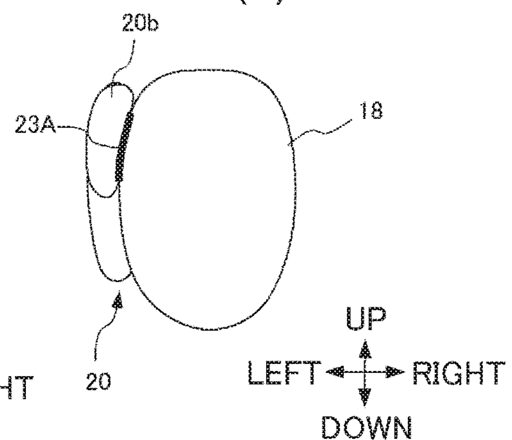
FIG. 13(C) is a front view.

FIGS. 13(A) and (B) show another modification of the first embodiment of the present invention, FIG. 13(A) is a side view, FIG. 13(B) is a top view, and FIG. 13(C) is a front view. According to the modification, a plurality of openings (two openings) 25 that bring the front passenger seat airbag 18 and the auxiliary airbag 20 into fluid-communication are provided or alternatively for example a tether may be provided across one opening to form a boundary part 25*a*, so that the opening is divided into a plurality of (two) openings, and the other structure is the same as that in FIG. 12. According to the modification, the size and number of the plurality of openings 25 are adjusted, so that the deployment speed for the auxiliary airbag 20 and the hardness in a fully deployed state can be controlled.

Figure 14A:
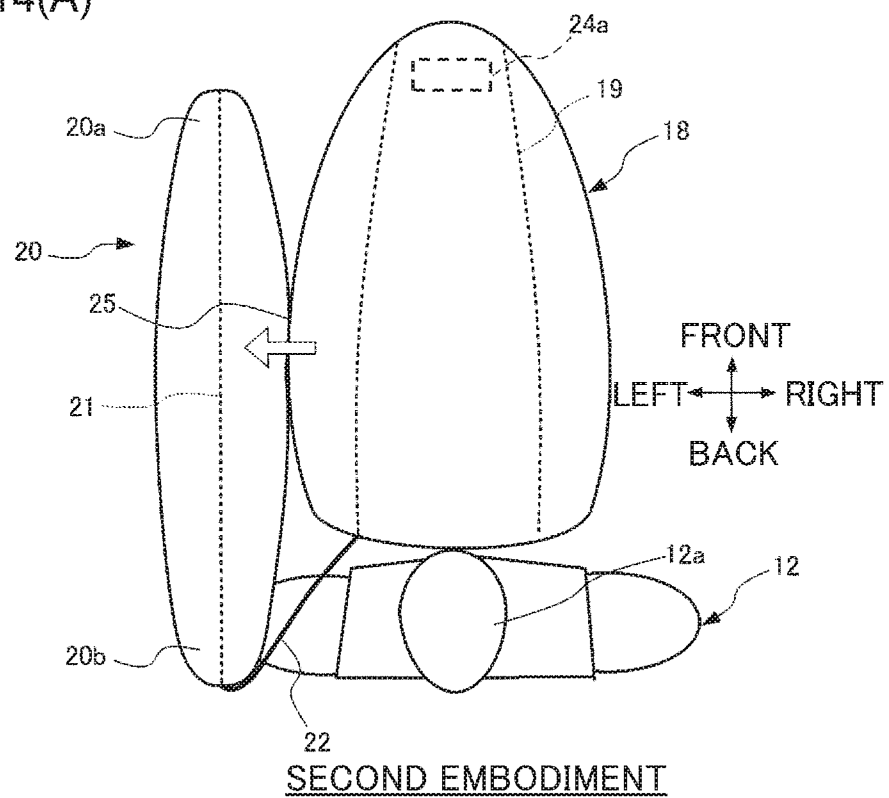
FIGS. 14(A) and (B) show an airbag device according to a second embodiment of the present invention during deployment in a frontal collision situation.
Figure 14B:
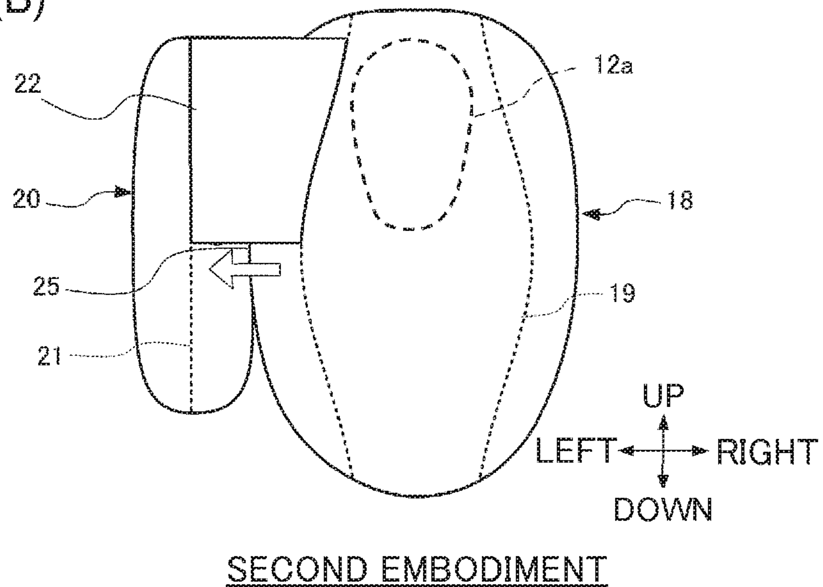
FIG. 14(B) is a front view.
Figure 15A:
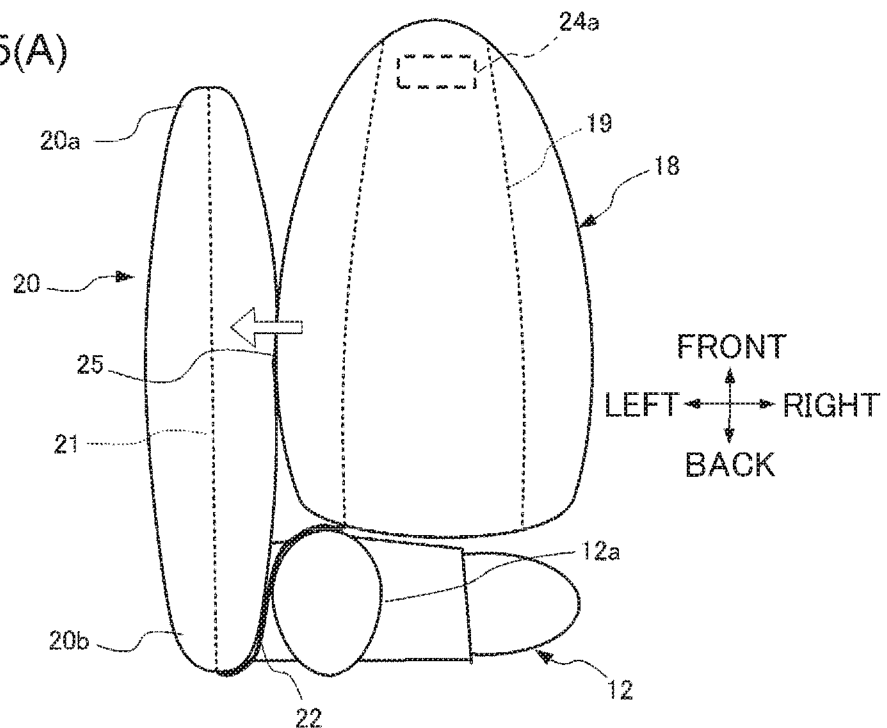
FIGS. 15(A) and (B) show an airbag device according to the second embodiment of the present invention during deployment in an oblique collision situation.
Figure 15B:
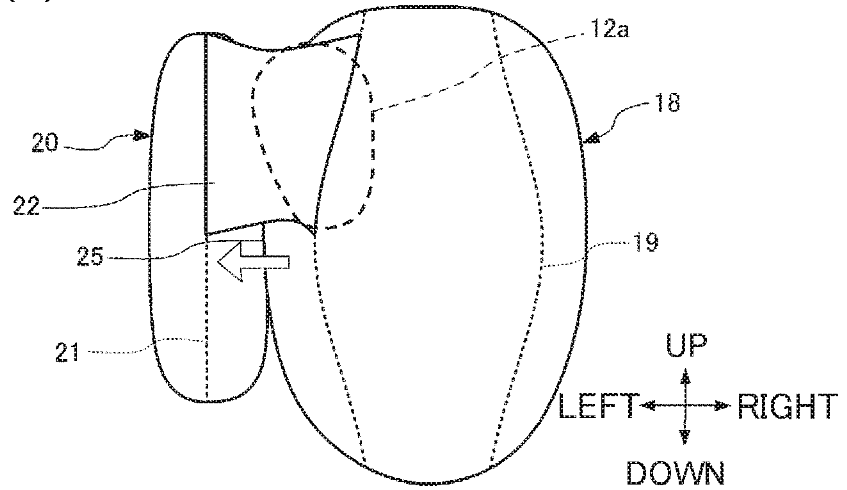
FIG. 15(B) is a front view.

FIGS. 14(A) and (B) show an airbag device according to a second embodiment of the present invention during deployment in a frontal collision situation, FIG. 14(A) is a top view, and FIG. 14(B) is a front view. FIGS. 15(A) and (B) show the airbag device according to the second embodiment of the present invention during deployment in an oblique collision situation, FIG. 15(A) is a top view, and FIG. 15(B) is a front view. The embodiment is different from the first embodiment described above in the manner of how the front passenger seat airbag 18 and the auxiliary airbag 20 are coupled.

According to the second embodiment, a rear end surface of the front passenger seat airbag 18 and a rear end surface of the auxiliary airbag 20 are coupled by a flexible panel 22, so that the head 12*a* of the occupant 12 is prevented from coming into the boundary between the airbags 18 and 20. Note that the panel 22 may be formed using the same fabric as the airbags 18 and 20. The edges of the panel 22 may be sewed together with and connected with the sewing line 19 of the front passenger seat airbag 18 and the sewing line 21 of the auxiliary airbag 20, so that the production process may be simplified. Since the panel 22 is formed using a flexible material such as fabric, impact upon the head 12*a* of the occupant 12 can be absorbed. As the head 12*a* pushes the panel 22, the rear end portion 20*b* of the auxiliary airbag 20 is pulled toward the head 12*a*, so that the head 12*a* can be restrained more quickly.

Now, third to fifth embodiments (modifications) of the present invention will be described with reference to FIG. 16 to FIG. 19.

In FIG. 16 to FIG. 19, L1 denotes the upper edge line from the center console 26 to the parietal region 100*a* of the occupant 12, L2 denotes the line from the center console 26 to the jaw part 100*b* of the occupant 12, and L3 denotes the line from the center console 26 to the shoulder 100*e* of the occupant 12. According to the first and second embodiments described above, the upper edge line of the auxiliary airbag 20 generally overlaps L1, the lower edge line generally overlaps L2, and the airbags are adapted to be deployed in the minimum necessary range. In contrast, according to this embodiment, the front end of the upper edge line of the auxiliary airbag 20 is offset from the line L1 and extends to the upper side (to the front part of the instrument panel 24). This structure ensures that the occupant 12 can be prevented from contacting the center console 26.

Figure 16:
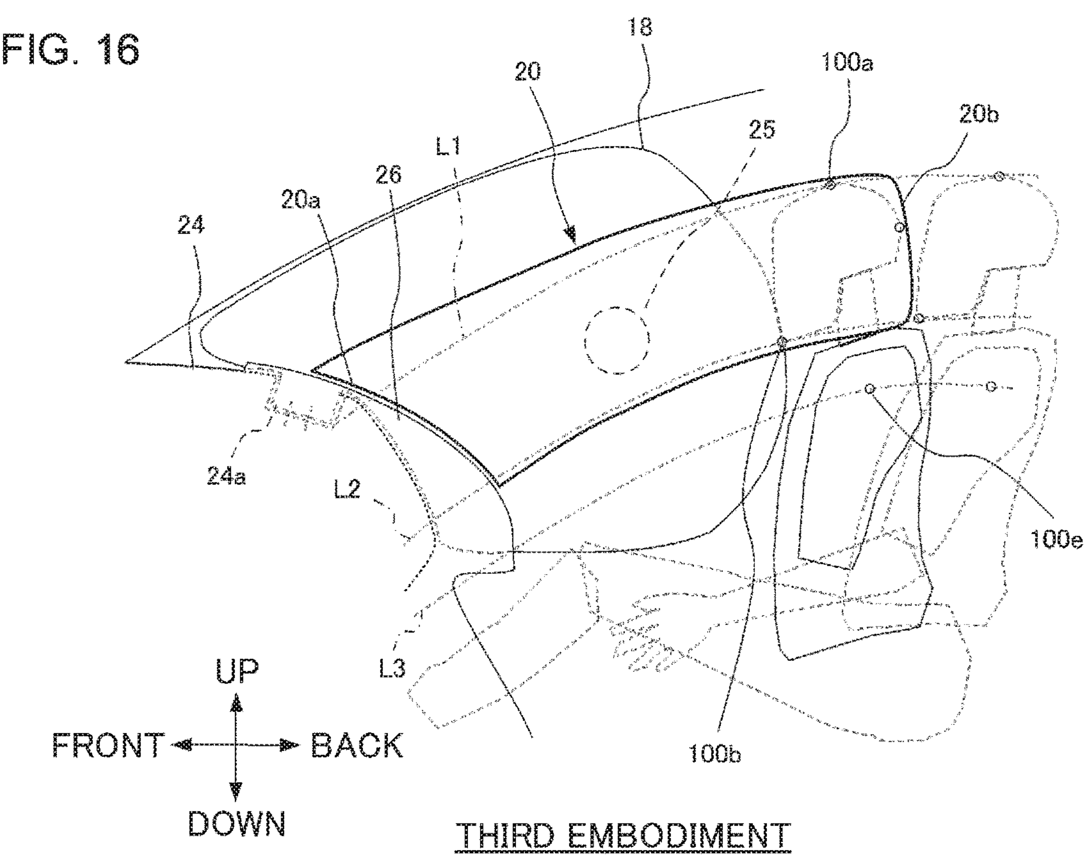
FIG. 16 is a side view of a structure of an airbag device according to a third embodiment of the present invention during deployment.

FIG. 16 is a side view of a structure of an airbag device according to the third embodiment of the present invention during deployment. The embodiment is different from the first embodiment described above in the shape of the front end of the deployed auxiliary airbag 20. The other structure may be the same as the first and second embodiments. According to the embodiment, the contact area between the auxiliary airbag 20 and the center console 26 increases, which increases reaction force to the occupant 12 and allows the deployed auxiliary airbag 20 to be maintained stably in a good position. More specifically, the area of the front end portion 20*a* of the auxiliary airbag 20 is greater than the area of the rear end portion 20*b*, which can contribute to stabilization of the shape of the bottom (base) of the airbag that would otherwise be relatively unstable for its flexibility.

Figure 17:
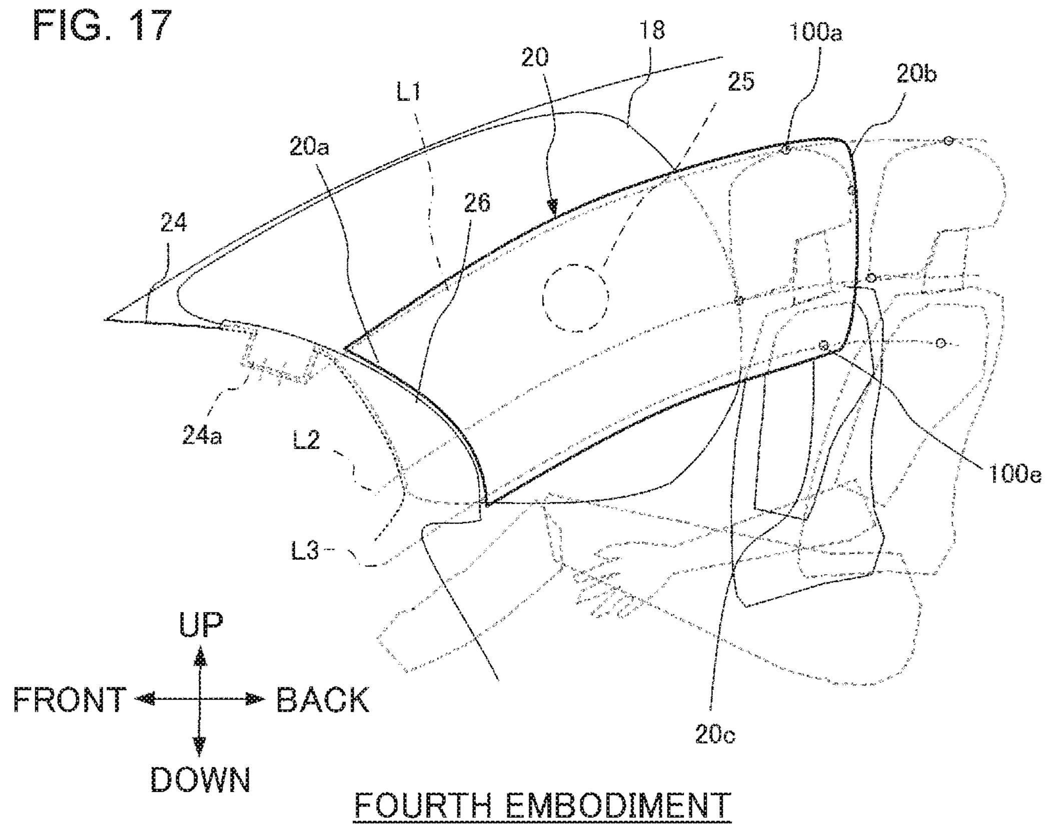
FIG. 17 is a side view of a structure of an airbag device according to a fourth embodiment of the present invention during deployment.

FIG. 17 is a side view of a structure of an airbag device according to the fourth embodiment of the present invention during deployment. According to the embodiment, the width of the auxiliary airbag 20 in the up-down direction is greater than the first and second embodiments. The other structure may be the same as the first and second embodiments. According to the embodiment, the lower edge line of the auxiliary airbag 20 is closer to the line L3 to the shoulder 100*e* of the occupant 12, so that the projected area of the auxiliary airbag 20 increases. Therefore, in addition to the advantageous effects brought about by the second embodiment, it is ensured that the occupant 12 can be prevented from moving laterally. This can also be an advantage because the embodiment can cope with occupants of different builds or in different postures in a flexible manner.

Figure 18:
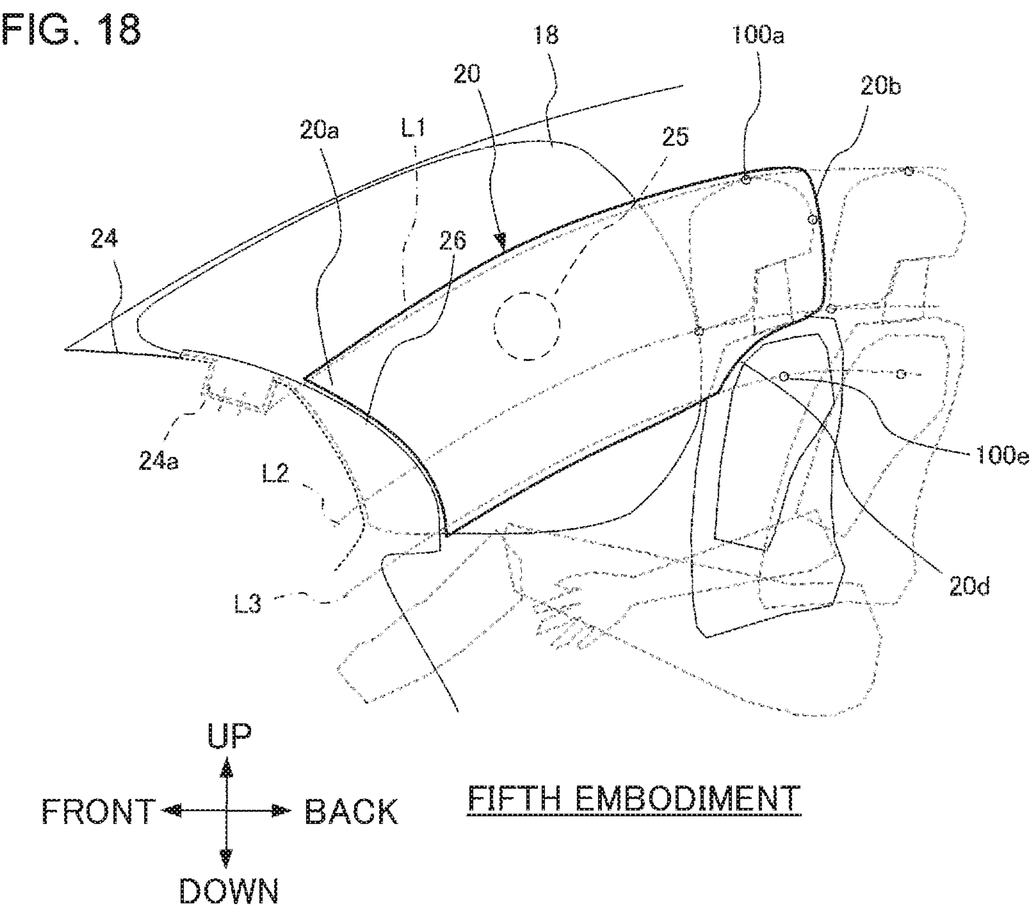
FIG. 18 is a side view of a structure of an airbag device according to a fifth embodiment of the present invention during deployment.

FIG. 18 is a side view of a structure of an airbag device according to the fifth embodiment of the present invention during deployment. According to the embodiment, the rear end portion of the auxiliary airbag 20 is deployed in a different shape from the fourth embodiment described above. The other structure may be the same as the first, second, and fourth embodiments.

According to the embodiment, the lower edge line of the auxiliary airbag 20 is closer to the line L3 to the shoulder 100*e* of the occupant 12, and a recess 20*d* is formed in a location of the rear end portion corresponding to the shoulder 100*e*. The structure allows the amount of base fabric necessary for the airbag to be reduced. In addition, the occupant 12 can be restrained in a stable posture, and the head 12*a* or the cervical region is less likely to bend backward.

Figure 19:
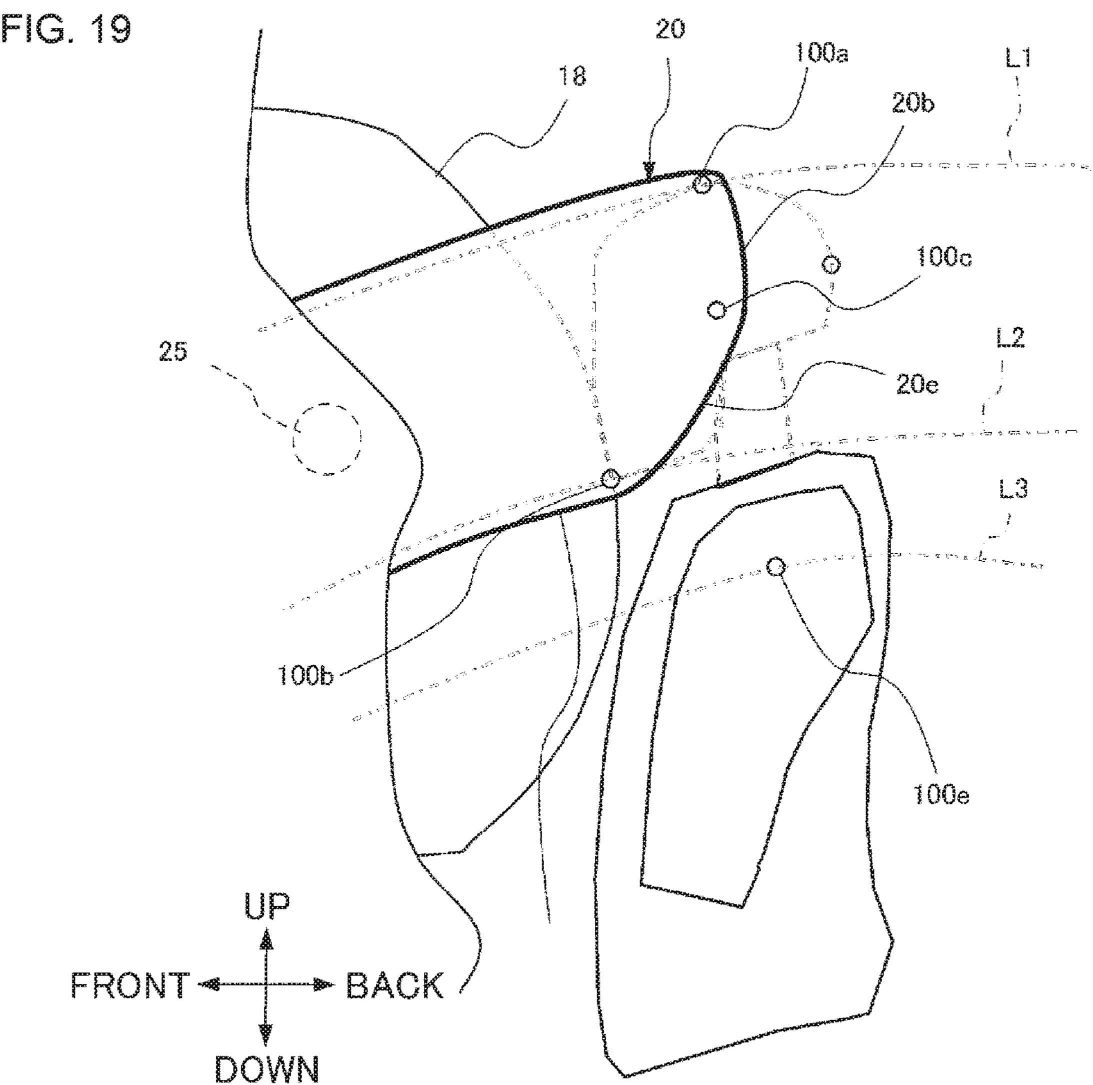
FIG. 19 is a side view of a structure of an airbag device according to a sixth embodiment of the present invention during deployment.

FIG. 19 is a side view of a structure of an airbag device according to the sixth embodiment of the present invention during deployment. The embodiment is a modification of the first and second embodiments, and the rear end portion of the auxiliary airbag 20 is deployed in a different shape. The other structure is the same as the first and second embodiments.

According to the embodiment, the rear end portion of the auxiliary airbag 20 is adapted to extend to the head center 100*c* without reaching the occipital region 100*d* of the occupant 12. An inclined portion 20*e* is formed so that the parietal region 100*a*, the jaw part 100*b*, and the head center 100*c* are covered within the minimum necessary range. The structure can minimize the necessary amount of base fabric for forming the auxiliary airbag 20. The capacity of the auxiliary airbag 20 is reduced to the minimum necessary level, so that the device as a whole can be compact and the output of the inflator can be minimized.

While the above description constitutes the preferred embodiment of the present invention, it will be appreciated that the invention is susceptible to modification, variation and change without departing from the proper scope and fair meaning of the accompanying claims.

The invention claimed is:

1. An airbag device for a vehicle adapted for deployment upon a vehicle impact, comprising:

a first airbag adapted to be deployed in front of an occupant of a seat to restrain the occupant from moving forward during the vehicle impact; and a second airbag coupled to a side of the first airbag on a center side of a vehicle interior adapted to restrain the occupant from moving laterally during the vehicle impact, the second airbag having a front end portion that reaches a center console during deployment, and a rear end portion positioned further behind a rear end of the first airbag and adapted to be positioned to extend to a center of the head of the occupant during the deployment while the occupant is in contact with the first airbag, wherein when the first and the second airbags are projected and observed from a side of the vehicle on the second airbag side, points are positioned in descending order of height of: E, C, D, A, and B, where point A is a highest point of the second airbag in contact with the center console, point B is a lowest point of the second airbag in contact with the center console, point C is a highest point in an overlapping area between a rear end surface of the first airbag and the second airbag, point D is a lowest point in an overlapping area between a rear end surface of the first airbag and the second airbag, and point E is a top of the second airbag.

2. The airbag device according to claim 1, further comprising wherein the rear end portion of the second airbag extends to an occipital region of the occupant during deployment.

3. The airbag device according to claim 1 further comprising an inflator that supplies inflation gas to the first airbag, wherein an opening communicating with both the first airbag and the second airbag is formed at a coupling part between the first and the second airbags, and the inflation gas flows from the first airbag to the second airbag during the deployment.

4. The airbag device according claim 3 further comprising wherein when the first and the second airbags are projected and observed from the side of the vehicle on the second airbag side, the opening is bounded within the points A, B, C and D.

5. The airbag device according to claim 1 further comprising wherein the rear end portion of the second airbag has an upper end reaching a parietal region of the occupant and a lower end reaching a shoulder of the occupant in a height direction.

6. The airbag device according to claim 1 further comprising wherein the first airbag and the second airbag are coupled by sewing, so that the head of the occupant is prevented from coming into a boundary between the first and the second airbags.

7. The airbag device according claim 6 further comprising wherein when the first and the second airbags are projected and observed from the side of the vehicle on the second airbag side, the sewing is bounded within the points A, B, C and D.

8. The airbag device according to claim 1 further comprising wherein a rear end surface of the first airbag and a rear end surface of the second airbag are coupled by a flexible panel, so that the head of the occupant is prevented from coming into a boundary between the first and the second airbags.

9. The airbag device according claim 1 wherein the vehicle is configured for the occupant in a passenger front seat and further configured for a vehicle driver in a driver seat laterally positioned from the passenger front seat and further comprising the second airbag is positioned between the occupant and the driver during the deployment.

10. The airbag device according to claim 1 further comprising wherein when the first and second airbags are projected and observed from the side of the vehicle on the second airbag side, the points are positioned in an order from the front to the back of: A, B, C, D, and E.

11. An airbag device for a vehicle adapted for deployment upon a vehicle impact, comprising:

a first airbag adapted to be deployed in front of an occupant of a seat to restrain the occupant from moving forward during the vehicle impact; and a second airbag coupled to a side of the first airbag on a center side of a vehicle interior adapted to restrain the occupant from moving laterally during the vehicle impact, the second airbag having a front end portion that reaches a center console during deployment, and a rear end portion positioned further behind a rear end of the first airbag and adapted to be positioned to extend to a center of the head of the occupant during the deployment while the occupant is in contact with the first airbag, wherein when the first and second airbags are projected and observed from a side of the vehicle on the second airbag side, points are positioned in an order from the front to the back of: A, B, C, D, and E, where point A is a highest point of the second airbag in contact with the center console, point B is a lowest point of the second airbag in contact with the center console, point C is a highest point in an overlapping area between a rear end surface of the first airbag and the second airbag, point D is a lowest point in an overlapping area between a rear end surface of the first airbag and the second airbag, and point E is a top of the second airbag.

12. The airbag device according to claim 11, further comprising wherein the rear end portion of the second airbag extends to an occipital region of the occupant during deployment.

13. The airbag device according to claim 11 further comprising an inflator that supplies inflation gas to the first airbag, wherein an opening communicating with both the first airbag and the second airbag is formed at a coupling part between the first and the second airbags, and the inflation gas flows from the first airbag to the second airbag during the deployment.

14. The airbag device according claim 13 further comprising wherein when the first and the second airbags are projected and observed from the side of the vehicle on the second airbag side, the opening is bounded within the points A, B, C and D.

15. The airbag device according to claim 11 further comprising wherein the rear end portion of the second airbag has an upper end reaching a parietal region of the occupant and a lower end reaching a shoulder of the occupant in a height direction.

16. The airbag device according to claim 11 further comprising wherein the first airbag and the second airbag are coupled by sewing, so that the head of the occupant is prevented from coming into a boundary between the first and the second airbags.

17. The airbag device according claim 16 further comprising wherein when the first and the second airbags are projected and observed from the side of the vehicle on the second airbag side, the sewing is bounded within the points A, B, C and D.

18. The airbag device according to claim 11 further comprising wherein a rear end surface of the first airbag and a rear end surface of the second airbag are coupled by a flexible panel, so that the head of the occupant is prevented from coming into a boundary between the first and the second airbags.

19. The airbag device according claim 11 wherein the vehicle is configured for the occupant in a passenger front seat and further configured for a vehicle driver in a driver seat laterally positioned from the passenger front seat and further comprising the second airbag is positioned between the occupant and the driver during the deployment.

* * * * *